US010557521B2

(12) United States Patent
Olson et al.

(10) Patent No.: US 10,557,521 B2
(45) Date of Patent: Feb. 11, 2020

(54) STAKE WITH CORD LOCK

(71) Applicant: The North Face Apparel Corp., Wilmington, DE (US)

(72) Inventors: Cory Michael Olson, Alameda, CA (US); Luke Matthews, Oakland, CA (US)

(73) Assignee: The North Face Apparel Corp., Wilmington, DE (US)

( * ) Notice: Subject to any disclaimer, the term of this patent is extended or adjusted under 35 U.S.C. 154(b) by 22 days.

(21) Appl. No.: 15/981,162

(22) Filed: May 16, 2018

(65) Prior Publication Data
US 2019/0353224 A1 Nov. 21, 2019

(51) Int. Cl.
*E04H 15/62* (2006.01)
*F16G 11/10* (2006.01)
*E02D 5/80* (2006.01)

(52) U.S. Cl.
CPC ............... *F16G 11/106* (2013.01); *E02D 5/80* (2013.01); *E04H 15/62* (2013.01)

(58) Field of Classification Search
CPC ......... E04H 15/62; E04H 15/32; E04H 15/64; E04H 12/2215; E04H 2015/326; E02D 5/80; F16G 11/106; F16G 11/12
USPC ..... 135/118, 120.1, 120.4; 52/156–157, 159, 52/164; 24/115 R, 129, 130, 131 C, 24/132 R; 248/156, 499, 508, 545; 47/42–43
See application file for complete search history.

(56) References Cited

U.S. PATENT DOCUMENTS

| 1,146,128 | A | * | 7/1915 | Brune ..................... E04H 15/62 135/118 |
| 1,773,760 | A | | 8/1930 | Steinbreder |
| 2,892,518 | A | * | 6/1959 | Fiske ..................... E02D 5/803 52/163 |
| 3,635,232 | A | | 1/1972 | Rotheiser |
| 3,732,878 | A | * | 5/1973 | Blankemeyer .......... E04H 15/62 135/118 |
| 3,814,118 | A | | 6/1974 | Larson |
| 4,566,660 | A | | 1/1986 | Anscher et al. |
| 4,944,476 | A | * | 7/1990 | Olson .................... A01G 25/00 248/87 |
| 5,158,258 | A | | 10/1992 | McFadzean |
| 5,390,890 | A | | 2/1995 | Ferguson et al. |

(Continued)

OTHER PUBLICATIONS

Speed Cinch, www.speedcinch.com as of Jun. 21, 2017.
International Search Report and Written Opinion for PCT Application No. PCT/US2019/026021, dated Jul. 1, 2019, 9 pages.

*Primary Examiner* — Winnie Yip
(74) *Attorney, Agent, or Firm* — Ganz Pollard, LLC

(57) ABSTRACT

A cord locking apparatus is described that includes an anchoring portion operative to be secured to a surface; and a cord lock portion having: a bottom coupled to the anchoring portion, and a top, a front, a first side, a second side, and a central axis defined between the top and the bottom; a channel extending from the front to one of the first side or second side along the bottom in a channel orientation direction, the channel operative to receive a cord therethrough; and a lock slot on the front side comprising a channel end at a bottom of the slot and a lock end at the top of the slot, and operative to receive and hold the cord in a tension lock direction at an angle to the channel orientation direction.

24 Claims, 8 Drawing Sheets

(56) References Cited

U.S. PATENT DOCUMENTS

| | | | | |
|---|---|---|---|---|
| 5,579,798 | A | * | 12/1996 | Pruitt ..................... E04H 15/62 |
| | | | | 135/118 |
| 5,815,993 | A | * | 10/1998 | Castola .................. E02D 5/803 |
| | | | | 52/166 |
| 7,472,874 | B2 | * | 1/2009 | Gross ................. E04H 12/2215 |
| | | | | 135/118 |
| 7,753,939 | B2 | * | 7/2010 | Ritland .............. A61B 17/7037 |
| | | | | 606/264 |
| D711,725 | S | | 8/2014 | Bainbridge |
| D714,129 | S | | 9/2014 | Bainbridge |
| D714,619 | S | | 10/2014 | Bainbridge |
| D741,150 | S | | 10/2015 | Bainbridge |
| D749,400 | S | | 2/2016 | Bainbridge |
| D774,625 | S | * | 12/2016 | Boughton .................... D23/217 |
| D776,518 | S | | 1/2017 | Bainbridge |
| 9,956,002 | B2 | * | 5/2018 | Jackson ............... A61B 17/701 |
| 10,125,956 | B2 | * | 11/2018 | Veloskey ................ F21V 17/02 |
| 2002/0147060 | A1 | * | 10/2002 | Wolf ..................... A63B 57/00 |
| | | | | 473/405 |
| 2010/0160963 | A1 | * | 6/2010 | Fallin ................ A61B 17/0401 |
| | | | | 606/232 |

\* cited by examiner

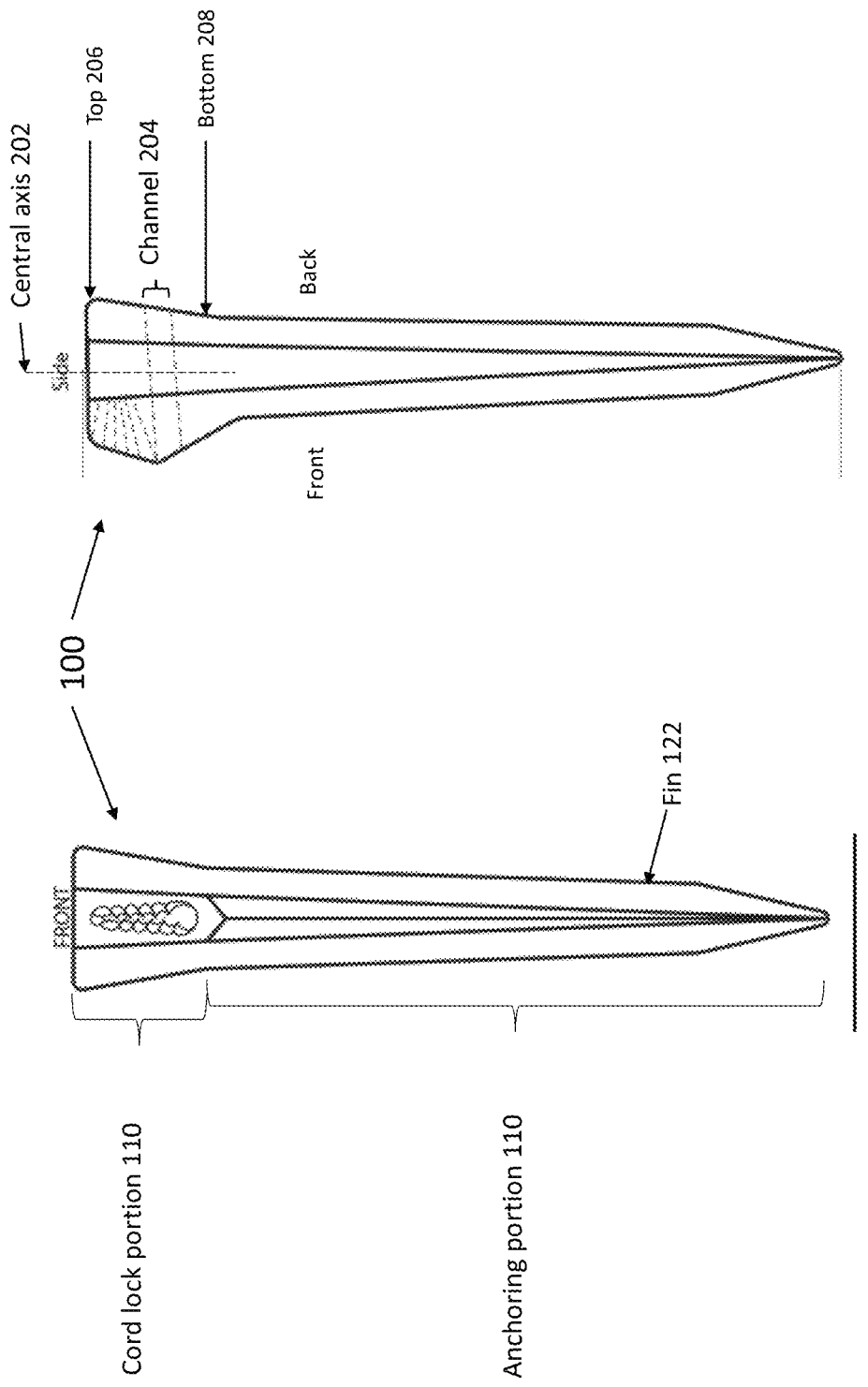

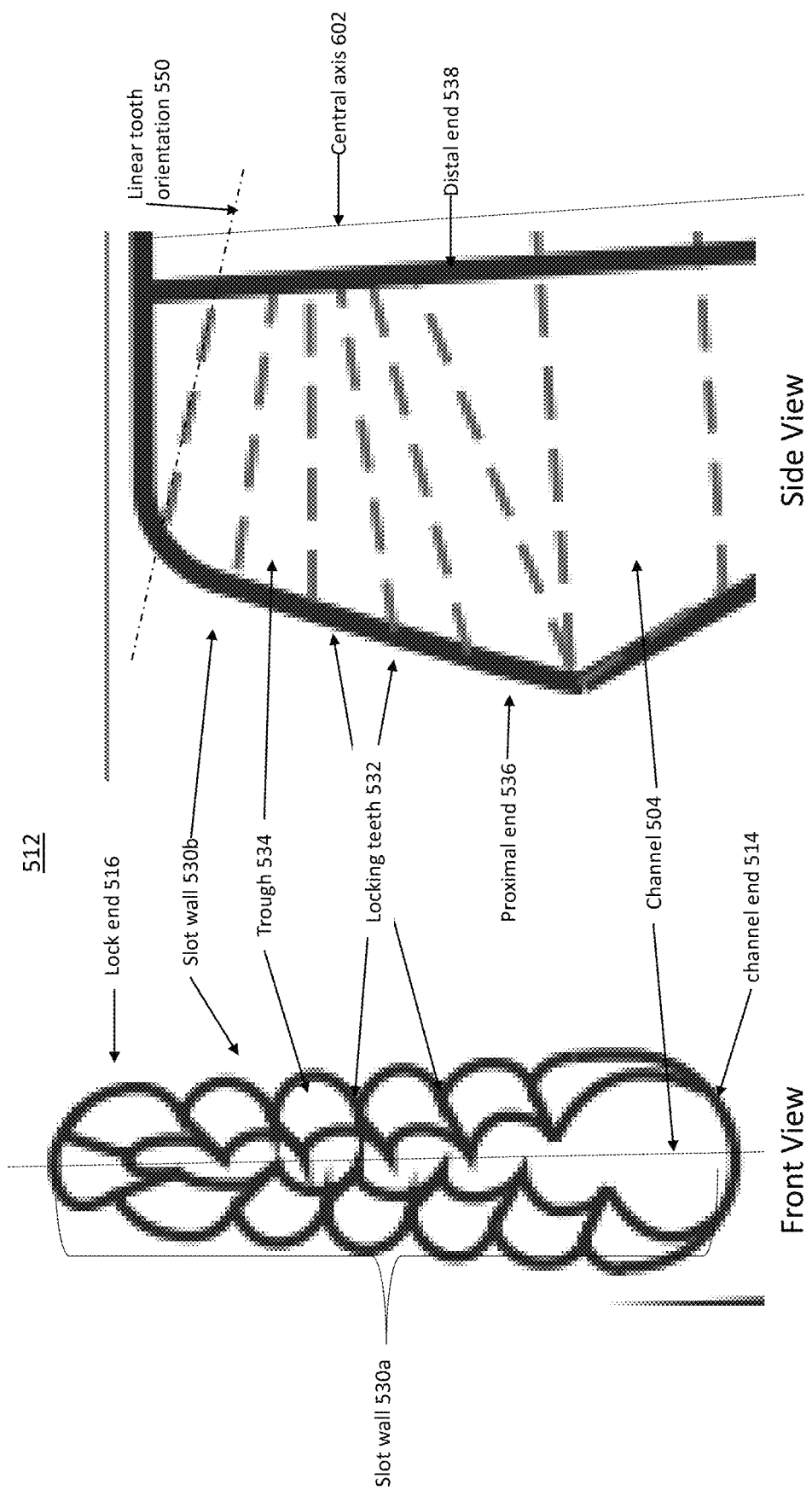
FIG. 6 Side View
FIG. 5 Front View

STAKE WITH CORD LOCK

BACKGROUND

The inventive subject matter is generally directed to a cord locking apparatus that holds and secures a cord. Conventional cord locking devices, particularly tent stakes or canopy stakes, may rely on the use of knots, cleats, clamps, or clasps to maintain tension on a cord. These devices may be difficult to use, for example, if the user is unfamiliar with effective knots, has limited hand mobility or dexterity, or is in a hurry. Cleats, clamps, or clasps may fail or break, releasing a locked cord unexpectedly.

In short, conventional cord locking devices have the foregoing and other disadvantages, and there is a need for improved cord locking devices that allow for quick and secure cord locking function, for example.

SUMMARY

The inventive subject matter generally relates to an apparatus for tensioning and securing one end of a cord to a fixed surface. In certain aspects, the inventive subject matter provides an innovative solution to the problem of securing a cord quickly and easily without the need for tying knots, or the use of additional mechanisms such as clasps or cleats.

In one possible embodiment, the inventive subject matter is directed to a cord locking apparatus having an anchoring portion operative to be secured to a surface; and a cord lock portion. The cord lock portion can include a bottom coupled to the anchoring portion, and a top, a front, a first side, a second side, and a central axis defined between the top and the bottom. The cord lock portion can also include a channel extending from the front to one of the first side or second side along the bottom in a channel orientation direction, the channel operative to receive a cord therethrough. The cord locking apparatus can further include a lock slot on the front side comprising a channel end at a bottom of the slot and a lock end at the top of the slot. The lock slot can be operative to receive and hold the cord in a tension lock direction at an angle to the channel orientation direction.

The lock slot can include first and second slot walls extending from a proximal side at the front of the cord lock portion to a distal side in proximity to the central axis in the channel orientation direction. The first and second slot walls can be spaced apart by a first distance at the proximal side and by a second distance at the distal side, where the bottom of the first and second slot walls forming the channel end. Each of the slot walls can have a plurality of locking teeth extending from the proximal side to the distal side and facing the plurality of locking teeth extending from the other slot wall.

The channel end of the lock slot can include the channel.

The channel end of the lock slot can be above, and open to, the channel.

The plurality of locking teeth on one slot wall can be offset from the plurality of locking teeth on the other slot wall.

The plurality of locking teeth on one slot wall can be aligned with the plurality of locking teeth on the other slot wall.

A first locking tooth of the plurality of locking teeth on one slot wall can have a different linear tooth orientation from the proximal end to the distal end than a second locking tooth of the plurality of locking teeth.

The first distance can be greater than the second distance.

The first distance can be equal to the second distance.

The lock slot lock end can be open on the top of the cord lock portion.

The anchoring portion can include an elongate tapered body ending in a pointed tip operative to be secured into a ground surface.

The anchoring portion can include a bracket operative to be secured to a flat surface.

The channel can be substantially cylindrical.

The channel can be an elliptical tube.

The channel can be a polygonal tube.

The channel can be substantially linear.

The channel can curve from the front to one of the first side or second side.

The cord lock portion can include a plurality of channels extending from one of the front, first side, or second side to another of the front, first side, or second side, each of the plurality of channels having a channel orientation direction. The cord lock portion can further include a lock slot operative to receive and hold a plurality of cords from at least two of the plurality of channels.

The cord lock portion can further include a plurality of lock slots, where each lock slot operative to receive and hold a cord from a different one of the plurality of channels.

The cord locking apparatus can include a plurality of anchoring portions coupled to the cord lock portion.

In one possible embodiment, the inventive subject matter is directed to a method of making a cord locking apparatus, comprising forming an anchoring portion operative to be secured to a surface; and forming a cord lock portion. The formed cord locking portion can have a bottom coupled to the anchoring portion, and a top, a front, a first side, a second side, and a central axis defined between the top and the bottom; a channel extending from the front to one of the first side or second side along the bottom in a channel orientation direction, the channel operative to receive a cord therethrough; and a lock slot on the front side comprising a channel end at a bottom of the slot and a lock end at the top of the slot, and operative to receive and hold the cord in a tension lock direction at an angle to the channel orientation direction.

The forming can include at least one of: extruding, three-dimensional printing, or molding.

In one possible embodiment, the inventive subject matter is directed to a method of using a cord locking apparatus that includes an anchoring portion operative to be secured to a surface; a cord lock portion having a bottom coupled to the anchoring portion, and a top, a front, a first side, and a second side, a channel extending from the front to one of the first side or second side along the bottom in a channel orientation direction; and a lock slot on the front side comprising a channel end at a bottom of the slot and a lock end at the top of the slot, and operative to receive and hold the cord in a tension lock direction at an angle to the channel orientation direction, where the method includes threading a cord through the channel; and pulling a portion of the cord that exits the channel from the front side upward through the lock slot.

The method can further include securing the anchoring portion to a surface.

The foregoing is not intended to be an exhaustive list of embodiments and features of the inventive subject matter. Persons skilled in the art can appreciate other embodiments and features from the following detailed description in conjunction with the drawings. These and other embodiments are described in more detail in the following detailed descriptions and the figures.

The following is a description of various inventive lines under the inventive subject matter. The appended claims, as originally filed in this document, or as subsequently amended, are hereby incorporated into this Summary section as if written directly in.

BRIEF DESCRIPTION OF THE DRAWINGS

The appended figures show embodiments according to the inventive subject matter, unless noted as showing prior art.

FIG. 1 shows a front side view of a cord locking tent stake.

FIG. 2 shows a cross-section side view of the cord locking tent stake of FIG. 1.

FIG. 5 shows an enlarged view of a lock slot of the cord lock portion of FIG. 3.

FIG. 6 shows an enlarged cross-section side view of lock slot of the cord lock portion of FIG. 3.

DETAILED DESCRIPTION

Figures 3, 4:
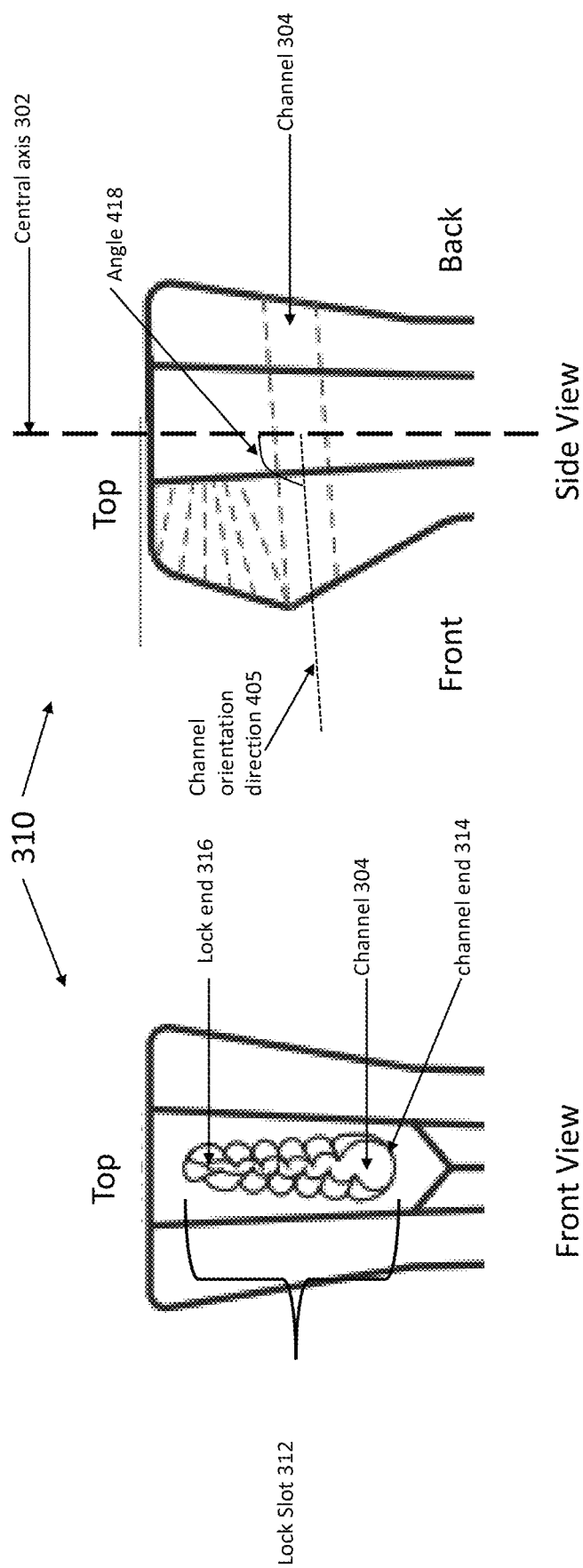
FIG. 3 shows an enlarged front side view of the cord lock portion of a cord locking apparatus.
FIG. 4 shows an enlarged cross-section side view of the side of the cord lock portion of FIG. 3.
Figure 7E:
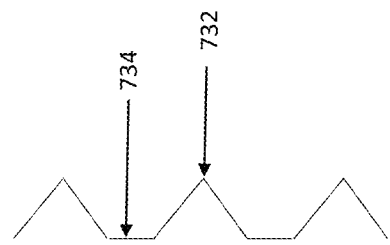
FIGS. 7A-7E show cross-sections of alternative embodiments of a slot wall.
Figure 7D:
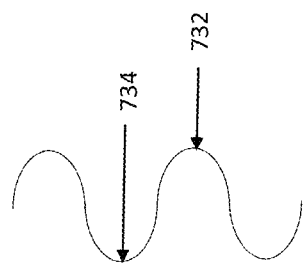
Figure 7C:
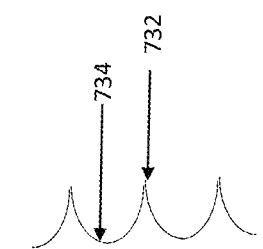
Figure 7B:
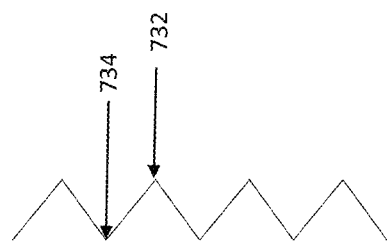
Figure 7A:
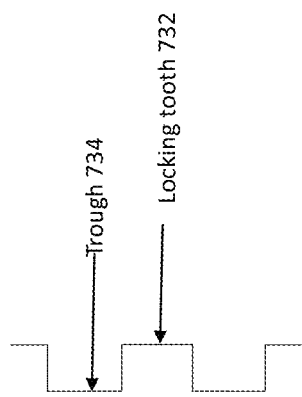

Representative embodiments according to the inventive subject matter are shown in FIGS. 1-12, wherein the same or generally similar features share common reference numerals.

The inventive subject matter generally relates to a cord locking apparatus that holds and secures a cord. A cord lock portion and an anchoring portion together form an apparatus that can hold and maintain tension on a cord without the use of knots, clamps, clasps, cleats or the like. In an embodiment, the apparatus may be a stake for securing, for example, tent cords or the like to the ground, snow, ice, or other surface that can receive and hold a stake. In other embodiments, the anchoring portion of the apparatus may be secured to a wall, floor, ceiling or other surface to hold and tension cords in indoor environments, for example.

The cord lock portion may include a channel to hold the cord and a lock slot. The lock slot may be aligned at an angle to the channel, and may hold the cord via friction, pressure or a combination thereof.

FIG. 1 shows a front side view of a cord locking apparatus embodied as a cord locking tent stake 100. The cord locking tent stake 100 may include a cord lock portion 110 and an anchoring portion 120. The cord lock portion 110 and the anchoring portion 120 may be formed as a single piece, or may be formed separately and connected together through some fastening means, such as an adhesive or a mechanical fastener.

In the illustrated embodiment, cord lock portion 110 and/or the anchoring portion of the tent stake 100 may be formed, e.g., extruded, three-dimensionally printed, or molded, from a rigid substance, for example, plastic, steel, aluminum, and so forth. The rigid substance may resist bending or warping and may withstand being driven into the ground, for example with a hammer or mallet, without deforming or breaking. The cord lock portion 110 may include a bottom side coupled to the anchoring portion 120, and a top. The cord lock portion 110 may have a polygonal cross-section, e.g., when viewed from the top, and may include several flat surfaced sides, for example, a front side, a back side opposite the front side, and additional sides between the front and back. The cord lock portion 110 may be circular or elliptical with curved sides. In such a curved embodiment, the front side may be defined as the part of the cord lock portion having a lock slot therein, while the back side may be defined at the part of the cord lock portion opposite the front.

The anchoring portion 120 may be an elongated tapered body or shaft ending in a pointed tip, and may include one or more fins 122 that extend outwardly radially from a central axis. The fins may enable the stake to be driven more easily into the ground and may allow the stake to resist being pulled from the ground prematurely. In other embodiments, the anchoring portion 120 may be a flat plate, a bracket, a hook, or any device capable of being affixed or connected to another surface.

FIG. 2 shows a cross-section side view of the cord locking tent stake 100. For the purposes of discussion, a central axis 202 may be defined to pass vertically between the top side 206 and the bottom side 208 of the cord lock portion 110, and may be at or near a center point of the top side or bottom side of the cord lock portion.

The cord lock portion may also include a channel 204. The channel 204 may extend between two sides of the cord lock portion and be open at both ends. The channel 204 may receive and hold a cord, e.g., a tent cord or guyline. A cord end may be threaded through one opening and pushed through the channel 204 to the other opening. For example, as illustrated, the channel 204 may extend from the front side to the back side. The channel 204 may be substantially linear from the front side to the back side. Alternatively, the channel 204 may follow a curved, serpentine or other non-linear path from the front side to the back side. In another embodiment, the channel 204 may have one or more turns or curves to extend from the front side to one of the sides instead of to the back side.

The channel 204 may be substantially cylindrical, i.e. having a circular or near-circular cross section. In alternative embodiments, the channel 204 may be an elliptical tube, or may be a polygonal tube, e.g., with a triangular, hexagonal, or other cross-sectional shape.

FIG. 3 shows an enlarged front side view of a cord lock portion 310 of a cord lock apparatus. The cord lock portion 310 may be a representative embodiment of the cord lock portion 110.

The cord lock portion 310 may include a lock slot 312. The lock slot 312 may have a bottom, e.g., channel end 314 and a top, e.g., lock end 316. The channel end 314 may include the opening of the channel 304, or may be positioned just above and open to the channel 304. The width of the lock slot 312 may taper from a larger channel end 314 to a narrower lock end 316. Alternatively, the width of the lock slot 312 may remain substantially constant from the channel end 314 to the lock end 316. The lock slot 312 is discussed in further detail with respect to FIGS. 5 to 9 below.

FIG. 4 shows an enlarged cross-section side view of the side of the cord lock portion 310. The channel 304 may have a channel orientation direction 405. When channel 304 is substantially linear, as in the illustrated example, the channel orientation direction 405 may correspond to an imaginary center line of the channel 304. If the channel 304 turns or curves and so has an opening on a side rather than the back, then the channel orientation direction 405 may correspond to an imaginary center line of the section of the channel 304 between the front side to where the channel 304 turns away from the back side.

The channel orientation direction 405 may be at an angle 418 to the central axis 302. In an embodiment, the angle 418 may be 90 degrees. In alternative embodiments, the angle 418 may be greater than or less than 90 degrees.

FIG. 5 shows an enlarged front view of a lock slot 512 of a cord lock portion. The lock slot 512 may be an embodiment of the lock slot 312.

The lock slot 512 may comprise a pair of spaced apart opposing slot walls 530a, 530b. In an embodiment, the respective slot walls 530 may join together at the lock end 516 to enclose the top of the lock slot 512. Alternatively, the respective slot walls 530 may remain spaced apart at the lock end 516.

FIG. 6 shows an enlarged cross-section side view of lock slot 512. In particular, one slot wall 530 is shown in cross-section. In the illustrated embodiment, the slot wall 530 has a number of locking teeth 532. Each locking tooth 532 protrudes inwardly toward the opposing slot wall and extends along the slot wall 530 between the proximal end 536 and the distal end 538 of the slot wall 530. As used herein, the proximal end 536 is the part of the lock slot 512 that is visible on the front of the cord lock portion, and the distal end 538 is the part of the lock slot 512 that is closer to the central axis 602, relative to the proximal end.

The locking teeth 532 may be separated from each other on the slot wall 530 by troughs 534.

In an embodiment, the respective slot walls 530 may end at the channel end 514. In an embodiment, the slot walls 530 at the channel end 514 may be spaced apart from each other by a distance equal to the diameter of the channel 504, or to the width of the channel 504 if the channel 504 is not round. The slot walls 530 may form the sides of the channel 504 at the channel end 514, or may end at or above the top of the channel 504 opening.

The points of a given the locking tooth 532 at the proximal end 536 and the distal end 538 may define a linear tooth orientation, e.g., linear tooth orientation 550. The linear tooth orientation 550 of a given locking tooth 532 may differ from the channel orientation direction, or may be parallel thereto. In an embodiment, the linear tooth orientation for each locking tooth may differ from the linear tooth orientation of one or more of the other locking teeth on the slot wall 530.

In an embodiment, the locking teeth 530 on one slot wall 530 may align with the troughs 534 on the opposing slot wall, that is, the locking teeth may be offset from the locking teeth on the opposing slot wall. Alternatively, the locking teeth 532 on one slot wall may be generally aligned with the locking teeth of the opposing slot wall.

The arrangement of the locking teeth and troughs on the respective slot walls may serve to receive and releasably hold a cord extending through the front side of the channel 504 that is pulled through the lock slot from the channel end 514 to the lock end 512. That is, the locking teeth and troughs may exert sufficient friction and/or pressure on the cord to hold the cord in place until the cord is pulled out from the lock end to the channel end, without needing, for example, to tie the cord to anything, to tie a knot, or to use a clasp or clamp.

FIGS. 7A-7E show various alternative embodiments of locking teeth and trough arrangements, in cross-section. The locking teeth 532 may protrude in a generally flat shape, as in FIG. 7A, in a pointed shape as in FIGS. 7B, 7C, and 7E, or may be rounded, as in FIG. 7D. The troughs 534 may be concave, as in FIGS. 7B-D, or generally flat, as in FIGS. 7A and 7E. Other shapes and arrangements of locking teeth and troughs may be used, and the embodiments are not limited to the illustrated examples. In an embodiment, the troughs 734 may be wider than the locking teeth 732. Alternatively, the troughs 734 and the locking teeth 732 may be equal in width, or the locking teeth 732 may be wider than the troughs 734.

Figure 8:
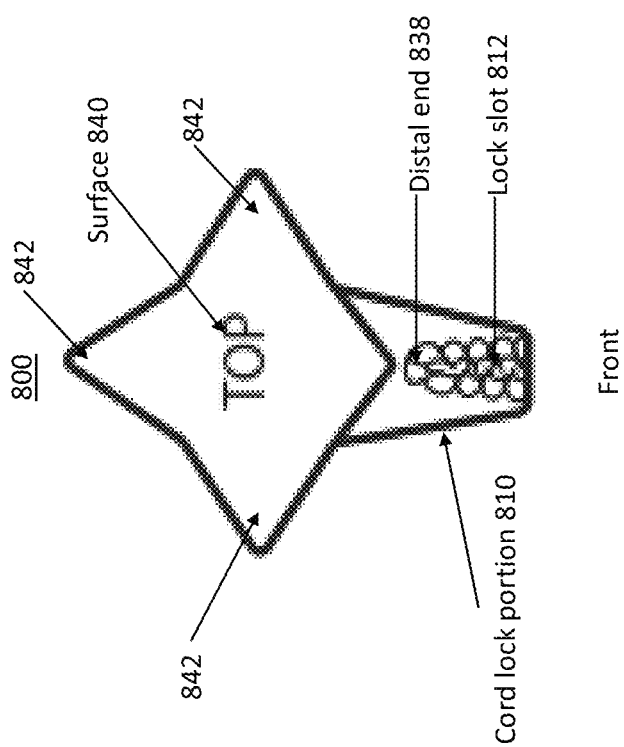
FIG. 8 shows a top-down view of a first alternative embodiment of the cord lock portion of FIG. 3.

FIG. 8 shows a top-down view of a first alternative embodiment of a cord lock portion 810 of a cord locking apparatus 800. The cord lock portion 810 may be an embodiment of cord lock portion 110 and/or 310.

The cord lock portion 810 may have a top surface 840. In a stake embodiment, the top surface 840 may provide a striking surface that can be struck by a hammer, mallet, piston or other such driving implement to drive the stake into the ground or anchoring substance. The surface 840 may be generally at least as wide as the top of the anchoring portion. The surface 840 may, in various embodiments, be generally flat, concave, or convex.

In an embodiment, the surface 840 may include one or more protruding elements 842 that may align with fins 122 on the anchoring portion 120. In alternative embodiments, the surface 840 may have any regular or irregular shape, e.g., circular, elliptical, triangular and so forth, that may or may not correspond to a shape of the anchoring section.

In the illustrated embodiment, the lock end of the lock slot 812 may be open at the top of the cord lock portion 810. The distal end 838 of the lock slot 812 may be outside of the surface 840 such that there is no opening in the surface 840 from the lock slot 812.

Figure 9:
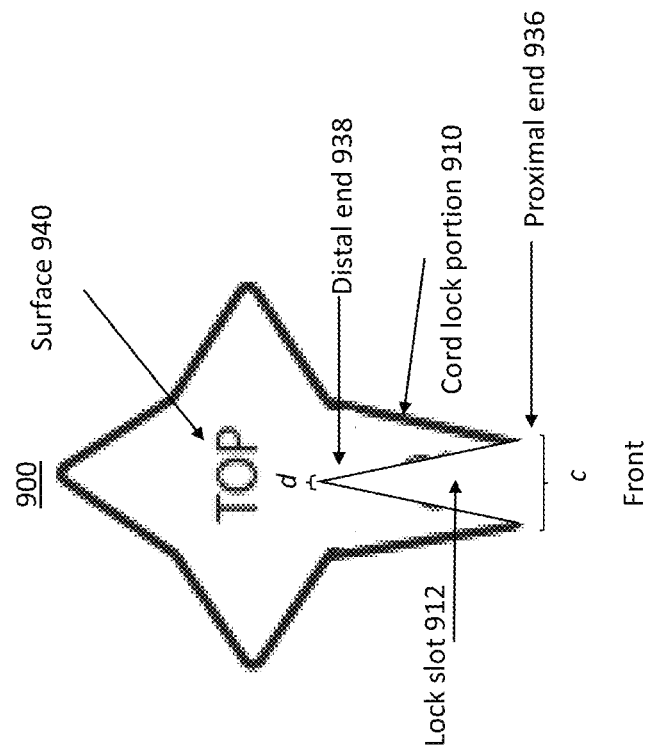
FIG. 9 shows a top-down view of a second alternative embodiment of the cord lock portion of FIG. 3.

FIG. 9 shows a top-down view of a second alternative embodiment of a cord lock portion 910 of a cord locking apparatus 900. The cord lock portion 810 may be an embodiment of cord lock portion 110 and/or 310.

The cord lock portion 910 may have a top surface 940, similar to the surface 840. However, in the illustrated embodiment, the distal end 938 of the lock slot 912 may be inside the surface 940, that is, a part of the top surface 940 may be open to the lock slot 912 at the lock end.

The slot walls of any of the lock slots discussed herein may be spaced apart by a distance c at the proximal end 936, and may be spaced apart by a distance d at the distal end 938, where c and d are non-negative numbers. In an embodiment, the distances c and d may be equal, and greater than zero. Alternatively, the distances c and d may be non-equal, with distance c being larger than distance d. Distance d may be greater than or equal to zero.

Figure 10:
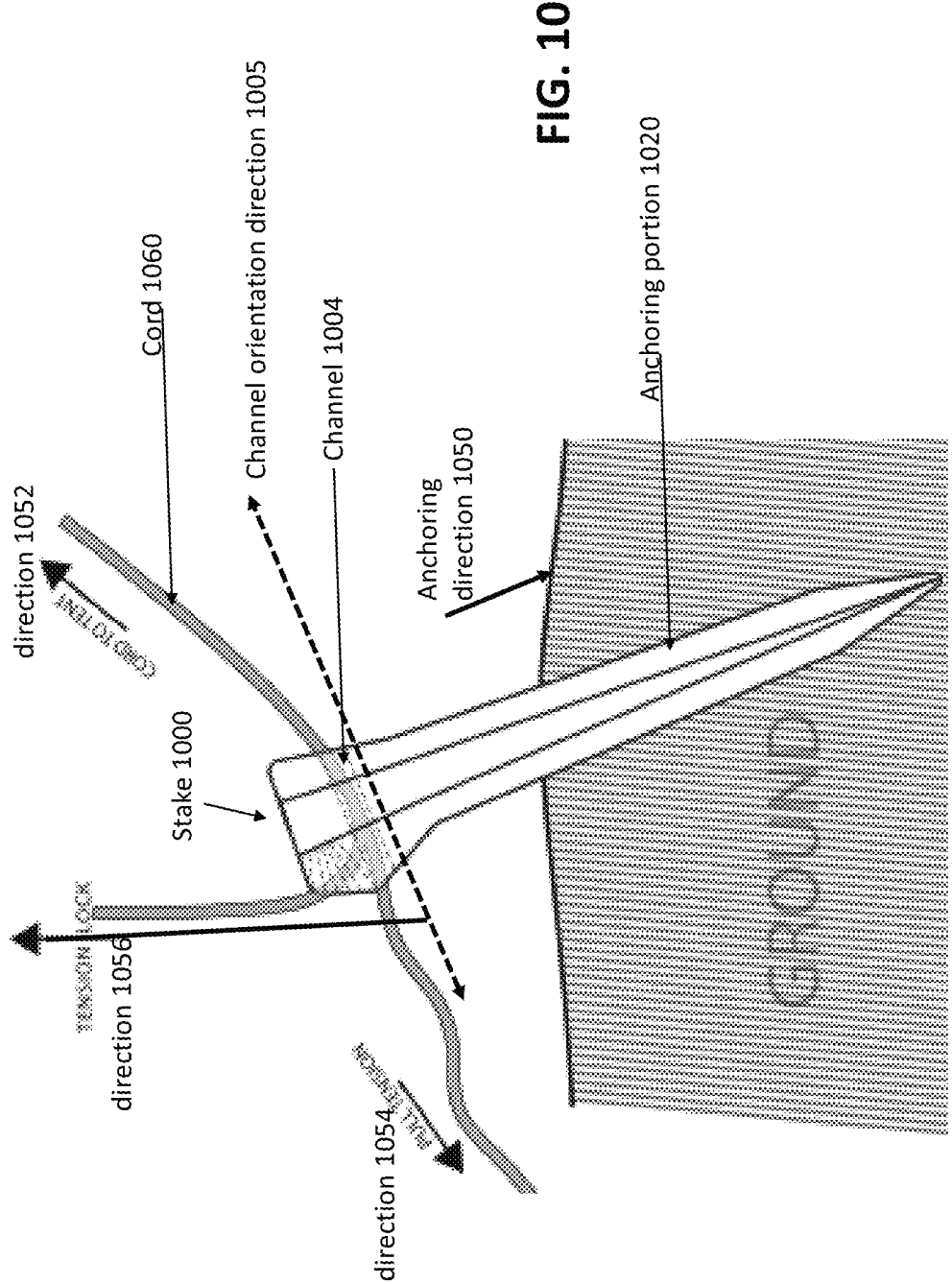
FIG. 10 shows an example of a use of the cord locking tent stake of FIG. 1.

FIG. 10 shows an example of a use of a cord locking tent stake 1000, which is shown in cross-section. In the illustrated example, the stake 1000 has been driven into the ground at an anchoring direction 1012, such that at least some portion of the length of the anchoring portion 1020 is underground and that the central axis is angled away from the item to be secured, e.g., the tent.

A cord 1060 passes through, and is partly enclosed by, the channel 1004. The section of the cord 1060 that extends away from the back side of the stake 1000 is attached to the item to be secured, e.g., the tent, in the direction 1052.

Prior to being secured, the section of the cord 1060 that extends from the front side and the cord lock portion of the stake 1000 may be pulled in the direction 1054 to remove slack and create tension on the cord 1060. When sufficient tension is achieved, this section of the cord may be pulled in the tension lock direction 1056 such that the cord passes through and is held by the cord lock portion. The tension lock direction 1056 may be at an angle relative to the channel orientation direction 1005. The cord 1060 held in the cord lock portion may remain in place, maintaining the tension in the direction 1052 until pulled away from the direction 1056 toward the direction 1054 to remove the cord from the cord lock portion.

Figure 11B:
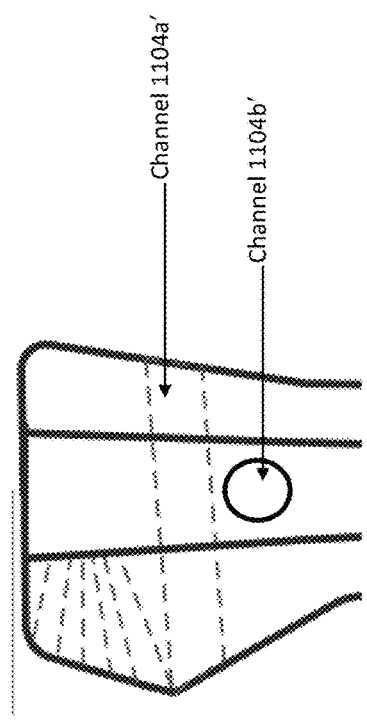
FIGS. 11A-B show an alternative embodiment of a cord lock portion of a cord locking apparatus.
Figure 11A:
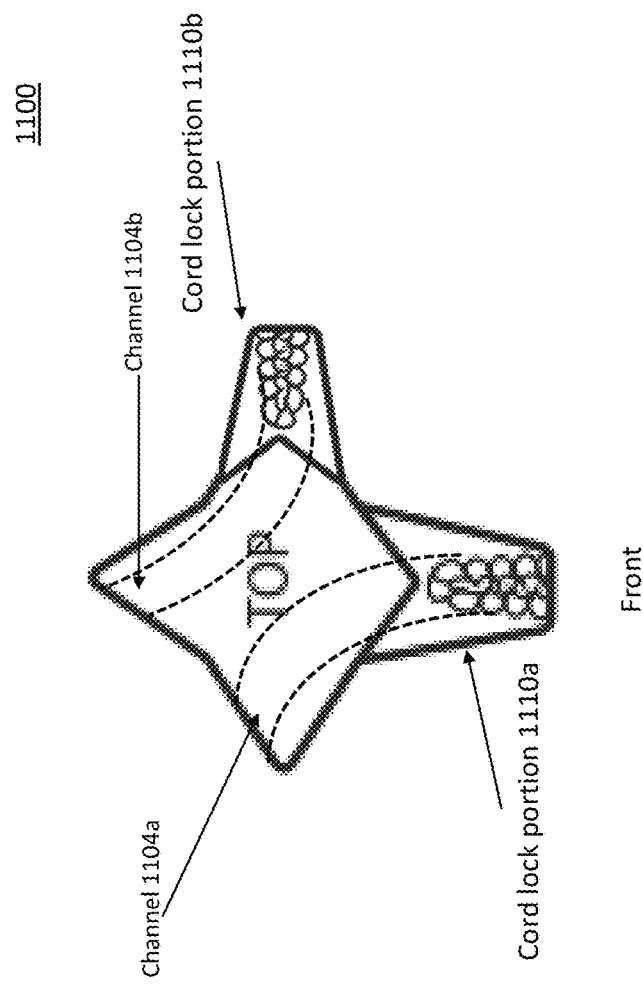

FIGS. 11A-B show an alternative embodiment of a cord lock portion of a cord locking apparatus 1100. The cord locking apparatus 1100 may be able to secure more than one cord at a time. To this end, the cord locking apparatus 1100 may have more than one cord lock portion, e.g., cord lock portion 1110a and 1110b. As shown in the illustrated top view example in FIG. 11A, the cord lock portions 1110 may be disposed on different sides of the cord locking apparatus 1100. Alternatively, the cord lock portions 1110 may be disposed on a same side of the cord locking apparatus 1100, for example, in a vertically stacked arrangement.

Each cord lock portion 1110a, 1110b may open to a different respective channels 1104a, 1104b. As shown in the example of FIG. 11A, the channels may turn or curve away from each other to different sides of the cord locking apparatus 1100. This arrangement may be useful if the channels are disposed at approximately the same height from the top of the apparatus. Each channel 1104 may open into a different respective lock slot in its respective cord lock portion 1110. Alternatively, one lock slot may be able to secure more than one cord, for example, if the channel openings are in a vertically stacked arrangement on the same side of the cord locking apparatus 1100.

Alternatively, FIG. 11B shows, in cross-section, two channels 1104a', and 1104b' that are substantially perpendicular to each other, where channel 1104b' is lower than channel 1104a', with respect to the top of the cord locking apparatus 1100.

The cord locking apparatus 1100 may therefore be able to secure and tension multiple cords at once, and may also be able to secure and tension cords that extend outward from the cord locking apparatus 1100 in different directions.

Figure 12:
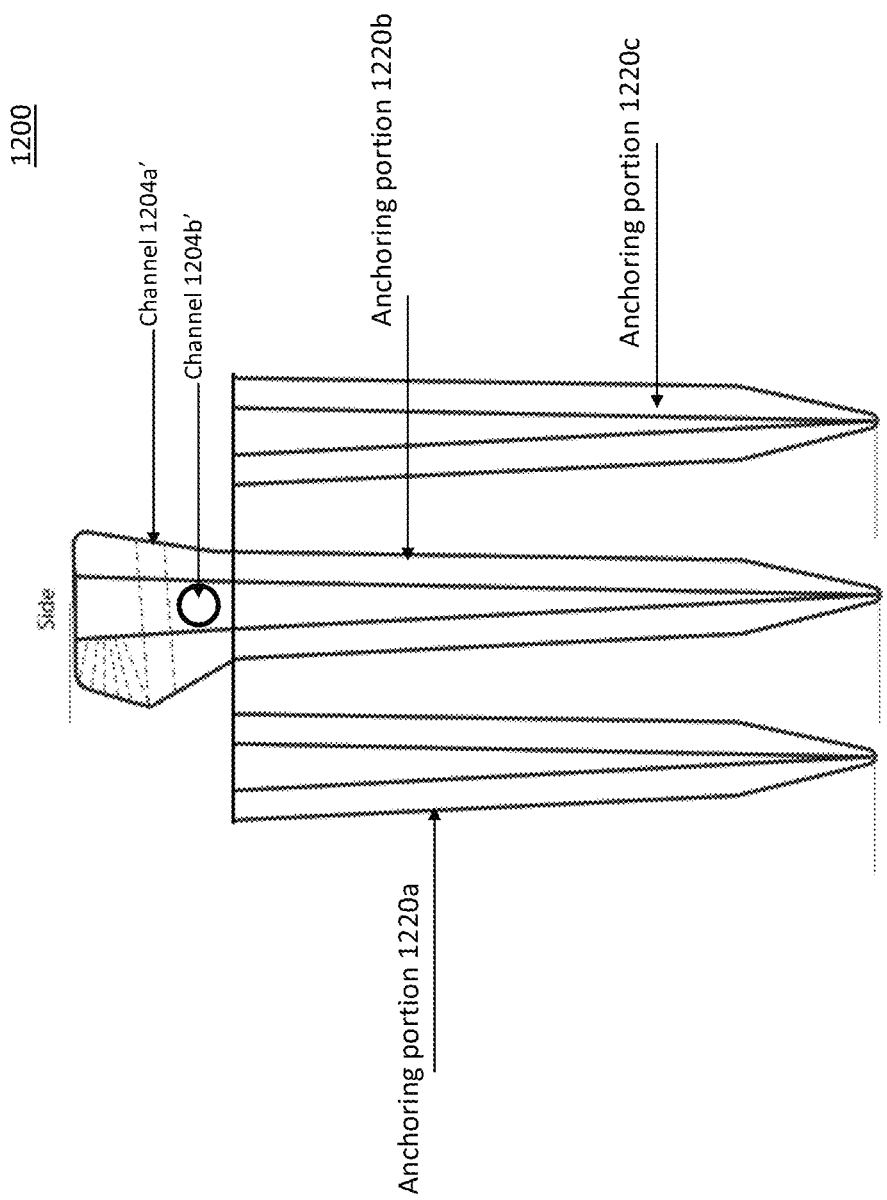
FIG. 12 shows an alternative embodiment of an anchoring portion of a cord locking apparatus.

FIG. 12 shows an alternative embodiment of an anchoring portion of a cord locking apparatus 1200. The cord locking apparatus 1200 may be an embodiment of the cord locking apparatus 1100. A cord locking apparatus that secures multiple cords, for example, through channels 1304a' and 1304b', may need to resist being pulled from the surface to which it is anchored from multiple directions. Accordingly, two or more anchoring portions 1320 may be attached to the cord lock portion of the cord locking apparatus 1200. For example, as shown, three anchoring portions, e.g., tent stake bodies 1320a, 1320b, and 1320c, may be attached to the cord lock portion of the cord locking apparatus 1200. The anchoring portions 1320 may be arranged linearly or offset from each other, or in any arrangement that maintains a secure attachment to the surface while maintaining tension on the cords.

Accordingly, embodiments of the cord anchoring apparatus may provide ways to quickly secure a cord without the use of knots, clasps, clamps, cleats, or the like, and likewise, to quickly release a secured cord from the apparatus.

As used herein, "and/or" means "and" or "or", as well as "and" and "or." Moreover, all patent and non-patent literature cited herein is hereby incorporated by references in its entirety for all purposes. The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the disclosed inventions are not intended to be limited to the embodiments shown herein, but are to be accorded the full scope consistent with the language of this disclosure, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. All rights to claim the subject matter disclosed herein are reserved, including the right to claim any and all combinations of subject matter described herein, including but not limited to all that comes within the scope and spirit of the following claims.

What is claimed is:

1. A cord locking apparatus comprising:
    an anchoring portion operative to be secured to a surface; and
    a cord lock portion having:
        a bottom coupled to the anchoring portion, and a top, a front, a first side, a second side, and a central axis defined between the top and the bottom;
        a channel comprising a tube extending from a first opening on the front to a second opening on one of the first side or second side along the bottom in a channel orientation direction, the channel operative to receive a cord therethrough; and
        a lock slot defining a second channel on the front side extending away from the channel toward the top of the cord lock portion, the lock slot defining a channel end at a bottom of the lock slot and a lock end at the top of the lock slot, and operative to receive and hold a first portion of the cord frictionally in a tension lock direction at an angle to a second portion of the cord disposed in the channel along the channel orientation direction.

2. The cord locking apparatus of claim 1, the lock slot further comprising:
    first and second slot walls extending from a proximal side at the front of the cord lock portion to a distal side in proximity to the central axis in the channel orientation direction, wherein the first and second slot walls are spaced apart by a first distance at the proximal side and are spaced apart by a second distance at the distal side, the bottom of the first and second slot walls forming the channel end; each of the slot walls having a plurality of locking teeth extending from the proximal side to the distal side and facing the plurality of locking teeth extending from the other slot wall.

3. The cord locking apparatus of claim 2, wherein the channel end includes the channel.

4. The cord locking apparatus of claim 2, wherein the channel end is above, and open to, the channel.

5. The cord locking apparatus of claim 2, wherein the plurality of locking teeth on one slot wall are offset from the plurality of locking teeth on the other slot wall.

6. The cord locking apparatus of claim 2, wherein the plurality of locking teeth on one slot wall are aligned with the plurality of locking teeth on the other slot wall.

7. The cord locking apparatus of claim 2, wherein a first locking tooth of the plurality of locking teeth on one slot wall has a different linear tooth orientation from the proximal end to the distal end than a second locking tooth of the plurality of locking teeth.

8. The cord locking apparatus of claim 2, wherein the first distance is greater than the second distance.

9. The cord locking apparatus of claim 2, wherein the first distance is equal to the second distance.

10. The cord locking apparatus of claim 1, wherein the lock slot lock end is open on the top of the cord lock portion.

11. The cord locking apparatus of claim 1, wherein the anchoring portion comprises an elongate tapered body ending in a pointed tip operative to penetrate into a ground surface.

12. The cord locking apparatus of claim 1, wherein the channel is substantially cylindrical.

13. The cord locking apparatus of claim 1, wherein the channel is an elliptical tube.

14. The cord locking device of claim 1, wherein the channel is a polygonal tube.

15. The cord locking apparatus of claim 1, wherein the channel is substantially linear.

16. The cord locking apparatus of claim 1, wherein the channel curves from the front to one of the first side or second side.

17. The cord locking apparatus of claim 1, wherein the cord lock portion comprises:
a plurality of channels extending from one of the front, first side, or second side to another of the front, first side, or second side, each of the plurality of channels having a channel orientation direction; and
a lock slot operative to receive and hold a plurality of cords from at least two of the plurality of channels.

18. The cord locking apparatus of claim 17, wherein the cord lock portion comprises:
a plurality of lock slots, each lock slot operative to receive and hold a cord from a different one of the plurality of channels.

19. The cord locking apparatus of claim 1, comprising:
a plurality of anchoring portions coupled to the cord lock portion.

20. The cord locking apparatus of claim 1, wherein the second channel extends in the channel orientation direction from a proximal end at the front of the cord lock portion toward a distal end wherein the distal end is closed on the one of the first or second side that has the second opening.

21. The cord locking apparatus of claim 20, wherein the lock slot extends from the proximal end to the distal end to a depth less than or equal to a distance from the front side to the central axis.

22. A method of making a cord locking apparatus, comprising:
extruding, three-dimensional printing, or molding an anchoring portion operative to be secured to a surface; and
extruding, three-dimensional printing, or molding a cord lock portion having:
a bottom coupled to the anchoring portion, and a top, a front, a first side, a second side, and a central axis defined between the top and the bottom;
a channel comprising a tube extending from a first opening on the front to a second opening on one of the first side or second side along the bottom in a channel orientation direction, the channel operative to receive a cord therethrough; and
a lock slot defining a second channel on the front side extending away from the channel toward the top of the cord lock portion, the lock slot defining a channel end at a bottom of the lock slot and a lock end at the top of the lock slot, and operative to receive and hold a first portion of the cord frictionally in a tension lock direction at an angle to a second portion of the cord disposed in the channel along the channel orientation direction.

23. A method of using a cord locking apparatus that includes an anchoring portion operative to be secured to a surface; a cord lock portion having a bottom coupled to the anchoring portion, and a top, a front, a first side, and a second side, a channel comprising a tube extending from a first opening on the front to a second opening on one of the first side or second side along the bottom in a channel orientation direction; and a lock slot defining a second channel on the front side extending away from the channel toward the top of the cord lock portion, the lock slot defining a channel end at a bottom of the lock slot and a lock end at the top of the lock slot, and operative to receive and hold a first portion of the cord frictionally in a tension lock direction at an angle to a second portion of the cord disposed in the channel along the channel orientation direction, the method comprising:
threading a cord through the channel; and
pulling a portion of the cord that exits the channel from the front side upward through the lock slot.

24. The method of claim 23, further comprising:
securing the anchoring portion to a surface.

* * * * *